(12) United States Patent
Ouyang et al.

(10) Patent No.: US 8,832,494 B2
(45) Date of Patent: Sep. 9, 2014

(54) METHODS AND APPARATUS FOR DISPLAYING VIDEO DESPITE A NONFUNCTIONAL OPERATING SYSTEM

(71) Applicant: Intel Corporation, Santa Clara, CA (US)

(72) Inventors: Qian Ouyang, Shanghai (CN); Yang Cong, Shanghai (CN); Jiewen Yao, Shanghai (CN); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/994,951

(22) PCT Filed: Sep. 26, 2012

(86) PCT No.: PCT/CN2012/081989
§ 371 (c)(1),
(2), (4) Date: Jun. 17, 2013

(87) PCT Pub. No.: WO2014/047798
PCT Pub. Date: Apr. 3, 2014

(65) Prior Publication Data
US 2014/0146183 A1 May 29, 2014

(51) Int. Cl.
*G06F 11/00* (2006.01)
*H04N 5/44* (2011.01)

(52) U.S. Cl.
CPC .................................... *H04N 5/44* (2013.01)
USPC .............................. 714/6.3; 714/4.5; 714/15

(58) Field of Classification Search
USPC ......................................................... 714/6.3
See application file for complete search history.

(56) References Cited

U.S. PATENT DOCUMENTS

| | | |
|---|---|---|
| 7,467,321 B1 | 12/2008 | Khurana et al. |
| 2007/0300189 A1 | 12/2007 | Zhao et al. |
| 2012/0084601 A1 | 4/2012 | Lee et al. |

FOREIGN PATENT DOCUMENTS

| | | |
|---|---|---|
| EP | 1873636 A2 | 1/2008 |
| WO | 9841916 A1 | 9/1998 |
| WO | 2014/047798 A1 | 4/2014 |

OTHER PUBLICATIONS

Intel "Fastboot BIOS", An Investigation of BIOS Speed Enhancement Featuring the Intel® Atom™ Processor, White Paper, Intel Corporation Embedded and Communications Group, Copyright 2008, pp. 1-13.
"Intel Management Engine (ME): Intel vPro: Three Generations Of Remote Management", on Aug. 14, 2012, pp. 1-4. retrieved from http://www.tomshardware.com/reviews/vpro-amt-management-kvm,3003-6.html.
"Intel vPro—Wikipedia, the free encyclopedia", Aug. 14, 2012, pp. 1-7, retrieved from http://en.wikipedia.org/wiki/Intel vPro.
PCT Search Report and Written Opinion Received received for PCT Application No. PCT/CN2012/081989, mailed on Jul. 11, 2013, 10 Pages.
"TCG Platform Reset Attack Mitigation Specification", Specification Version 1.00, Revision 1.00, TCG Published, Copyright © TCG 2008, May 15, 2008, pp. 1-15.
Xing, et al. "UEFI Fast Boot for Microsoft Windows 7: Fast Boot Without Compromising your BIOS", Intel Developer Forum, 2010, pp. 1-31.

*Primary Examiner* — Kamini Patel
(74) *Attorney, Agent, or Firm* — Barre Law Firm, PLLC

(57) ABSTRACT

A first video messaging service, running on top of an operating system in a data processing system, automatically presents a first video message. After using the first video messaging service to present the first video message, the data processing system automatically determines whether the first video messaging service has become nonfunctional. In response to determining that the first video messaging service has become nonfunctional, the data processing system automatically uses a backup video messaging service to present a second video message. The backup video messaging service operates in a boot environment. In one embodiment, the data processing system is configured to provide digital signage, the first video messaging service presents content for the digital signage when the operating system is operational, and the second video messaging service presents content for the digital signage when the operating system is nonfunctional. Other embodiments are described and claimed.

30 Claims, 5 Drawing Sheets

METHODS AND APPARATUS FOR DISPLAYING VIDEO DESPITE A NONFUNCTIONAL OPERATING SYSTEM

TECHNICAL FIELD

The present disclosure relates in general to data processing systems. More particularly, the present disclosure relates to technology for displaying video despite a nonfunctional operating system.

BACKGROUND ART

Electronic displays may be used to present advertisements and other information. For instance, an electronic display near a road may present advertisements concerning goods or services for sale, and an electronic display in an airport may present flight times. An electronic display that is configured to present advertisements or other information may be referred to as an electronic sign or a digital sign. A digital sign may include one or more display devices in communication with one or more processing devices.

One of the advantages of a digital sign is that it is relatively easy to change the information presented by the sign. For instance, if the display device of a digital sign is driven by a local processing device, and the local processing device can be reconfigured via a remote processing device, the operator of that digital sign may be able to easily change the information that is displayed on the sign from halfway around the world. In addition, digital signs can be configured to automatically change the information being displayed. For instance, a digital sign may be configured to automatically progress through a sequence of advertisements on a periodic basis. And one data processing system may use local area and/or wide area networks to control multiple digital signs.

However, one of the disadvantages of digital signs is that they are subject to failure. For instance, when content for a digital sign is stored on a hard disk drive and the content includes a large amount of data (e.g., moving pictures), presentation of the content may require many reads to the hard disk drive, which may increase the likelihood of disk failure. Also, the processing device that is supposed to drive the display device for a digital sign may pick up a software virus or other malware, and that malware may cause the processing device to malfunction. If there is a failure of the processing device, the display device may respond by going blank, by displaying an error message, or by otherwise failing to display information that is useful for the intended audience of the sign.

A processing device may include a remote management module that provides an out-of band communication channel for network communications. In other words, a remote management module may allow a processing device to send and receive network communications without using the operating system or the central processing unit (CPU) of the processing device. Accordingly, a remote management module may allow the processing device to be serviced from a remote location, despite a nonfunctional operating system. Some processing devices include remote management modules which use the technology known as INTEL Active Management Technology (AMT). Other processing devices use other types of remote management modules.

However, even when a remote management module is used to service a processing device with a nonfunctional operating system, many minutes or hours may be required to get the processing device fixed. A conventional processing device for a digital sign may fail to display information that is useful for the intended audience of the sign for the entire time that the operating system is nonfunctional.

Note: the word "Intel" is a registered trademark of Intel Corporation, and it is presented hereinafter in all capital letters, in accordance with section 608.08(v) of the Manual of Patent Examining Procedure (MPEP). Also, in this document, forward slashes in uniform resource locators (URLs) have been replaced with the character "=" to avoid live links, in accordance with section 608.01(p) of the MPEP.

BRIEF DESCRIPTION OF THE DRAWINGS

Features and advantages of the present invention will become apparent from the appended claims, the following detailed description of one or more example embodiments, and the corresponding figures, in which:

DESCRIPTION OF THE EMBODIMENTS

The present disclosure involves a backup video module that enables a data processing system to present video despite a nonfunctional operating system or a nonfunctional primary video module (e.g., a digital signage application).

Figure 1:
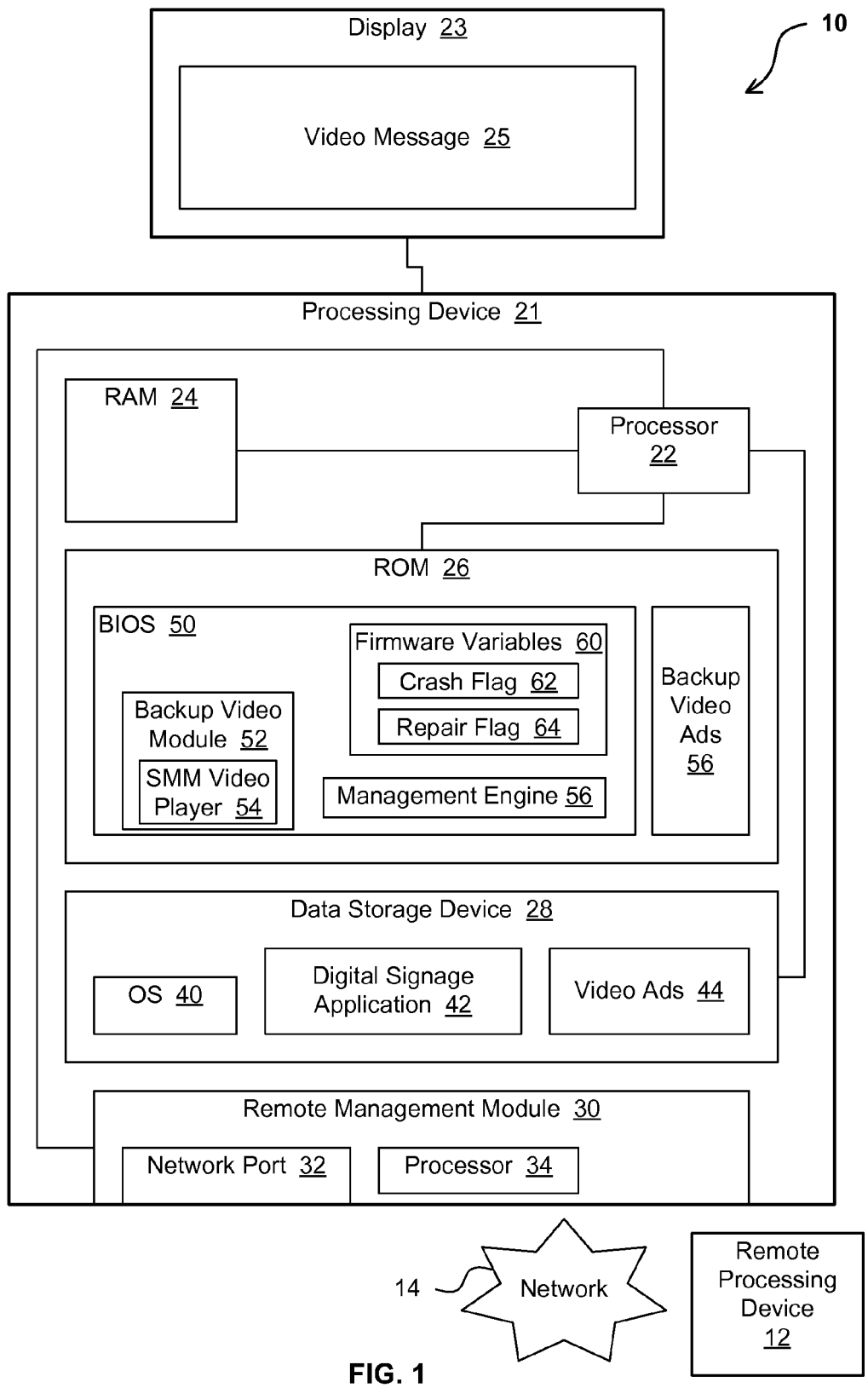
FIG. 1 is a block diagram of a data processing system with a backup video module for presenting video messages despite a nonfunctional operating system, according to an example embodiment.

FIG. 1 is a block diagram of one example embodiment of such a data processing system 10. In the embodiment of FIG. 1, the data processing system is configured to present at least one video message 25 on at least one display 23. The video messages may include many different types of messages, including without limitation advertisements or "ads," travel information, safety information, greetings, etc. Accordingly, the data processing system may be referred to as a digital sign, and the messages that are presented by the data processing system may be referred to as digital signage.

For purposes of this disclosure, the terms "video message" and "video content" are used to refer to (a) information that is presented by a processing device, typically on a display device, to be visually perceived by humans; and to (b) data that embodies or encodes such information. The information in a video message may include without limitation text, graphics, still pictures, and moving pictures. Video messages may also include audio. For purposes of this disclosure, the terms "audio-visual content" and "A/V content" denote a video message that also includes audio, the term "moving video content" denotes a video message that includes moving pictures, and the term "moving A/V content" denotes a video message that includes moving pictures and audio. In addition, for purposes of illustration, much of this disclosure (including FIG. 1) is directed to a scenario involving the presentation of video ads. However, other types of video content may be presented in other scenarios. Accordingly, the term "video ad" should be understand as pertaining also to video content that is not necessarily an advertisement, unless a more limited meaning is clearly required by the context.

In the embodiment of FIG. 1, the display is connected to a processing device 21 that has at least one central processing unit (CPU) or processor 22, with random access memory (RAM) 24, read-only memory (ROM) 26, and a nonvolatile mass data storage device 28 responsive to the processor. The data storage device may be implemented as a hard disk drive, as nonvolatile memory, or using any other suitable storage medium. The ROM contains a basic input/output system (BIOS) 50. In one embodiment, the BIOS follows the Unified Extensible Firmware Interface (UEFI) specification. UEFI Specification Version 2.3.1c, approved June 2012, is available at www.uefi.org=specs. The data storage device contains an operating system (OS) 40 and a digital signage application 42. The digital signage application is designed to run on top of the operating system and, when running, to provide a video messaging service that causes the processing device to present at least one video ad or other video message on the display. As illustrated in FIG. 1, the video ads 44 to be presented on the digital sign by the digital signage application may also be stored in the data storage device.

Figure 2:
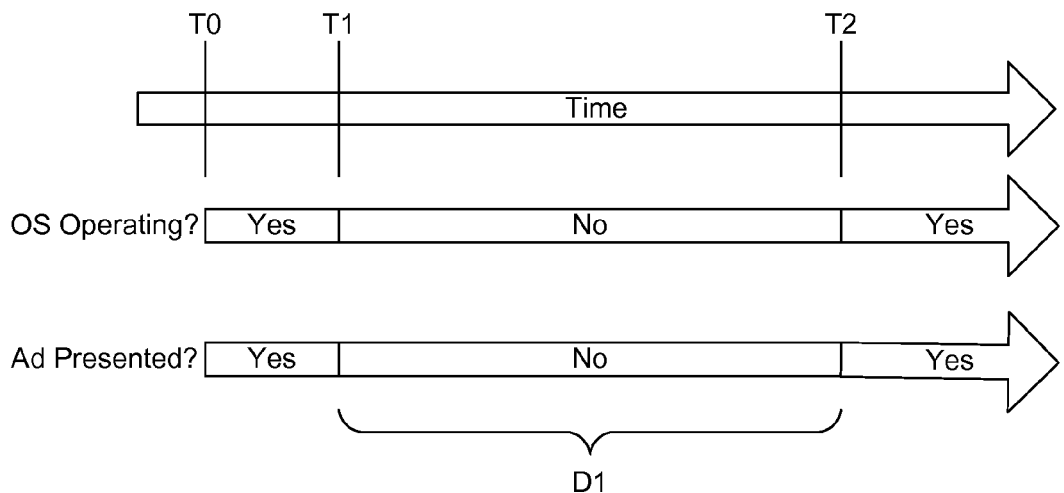
FIG. 2 presents an example timeline for handling a nonfunctional operating system in a conventional processing system.

FIG. 2 presents an example timeline for handling a nonfunctional operating system in a conventional processing system configured to serve as a digital sign. At time T0 of the timeline the operating system is functioning normally in the processing system, a digital signage application is running on top of the operating system, and the digital signage application is causing the processing system to present video ads on one or more display devices. Then at time T1 the operating system crashes, bringing the digital signage application down with it. Consequently, the processing system stops presenting any video ads. Instead, the processing system may be presenting an error message, a so-called "blue screen of death," some other information that is not useful to the intended audience of the digital sign, or nothing at all. After the operating system crashes, a remote management module is used to fix the processing system from a remote processing device. Eventually, after whatever necessary diagnostic and corrective actions have been taken, the operating system and the digital signage application become functional again. The digital signage application may then resume presentation of video ads. Time T2 shows when the digital signage application first resumes presentation of video ads. As illustrated by the two arrows underneath the main timeline in FIG. 2, for the entire interval of time between T1 and T2 (labeled as duration D1), whenever the operating system is nonfunctional the processing system is not presenting video ads.

As described in greater detail below, the present disclosure describes technology for significantly reducing the amount of downtime for a digital sign when an operating system crashes.

Referring again to FIG. 1, the illustrated processing device also includes a remote management module 30 that includes an embedded processor 34 and a network port 32. The embedded processor may also be referred to as a service processor. In one embodiment, the remote management module uses INTEL AMT. Additional details about INTEL AMT may be found on the Internet at en.wikipedia.org=wiki=Intel_Active_Management_ Technology and at www.intel.com=content=www= us=en=architecture-and-technology=intel-active-management-technology.html.

Other embodiments may use other types of remote management modules. The remote management module is responsive to the main processor, and vice versa. The remote management module may also communicate with some or all of the other components of the processing device. The processing device may also include various other components in communication with the processor and/or the remote management module, such as bridges, input/output (I/O) ports, etc.

The processing device may connect to or communicate with one or more remote processing devices 12 via the network port and one or more networks 14, which may include local area networks (LANs) and/or wide area networks (WANs) (e.g., the Internet).

One of the functions of the BIOS is to perform various boot operations upon startup or reset of the processing device, to prepare the processing device to run the operating system. The processing system and BIOS may be referred to collectively as a platform. The BIOS may also be referred to as firmware. In the embodiment of FIG. 1, the BIOS includes a management engine 56 that works with the remote management module to enable remote management of the processing device. In one embodiment, the management engine runs on the service processor. The BIOS also includes various firmware variables which retain data despite a reset of the processing device. As described in greater detail below, those firmware variables include a crash flag 62.

In addition, the BIOS includes a backup video module 52 which is capable of running when the operating system is nonfunctional. The backup video module is designed to provide a backup video messaging service. When the operating system is nonfunctional, the backup video messaging service causes the processing device to present at least one video ad or other video message on the display. For instance, in the embodiment of FIG. 1, the backup video module includes a video player 54 that is capable of running in system management mode (SMM) when the operating system is nonfunctional. (When SMM is running on the processing device, all normal execution (including the OS) may be suspended, and special separate software (e.g., firmware or a hardware-assisted debugger) may be executed in high-privilege mode.) Video player 54 is even capable of presenting moving A/V content, despite a nonfunctional operating system. The processing device also includes one or more backup video ads 56 (or other video messages). The backup video messages may be stored in ROM 26, and they may include without limitation moving A/V content.

Figure 3:
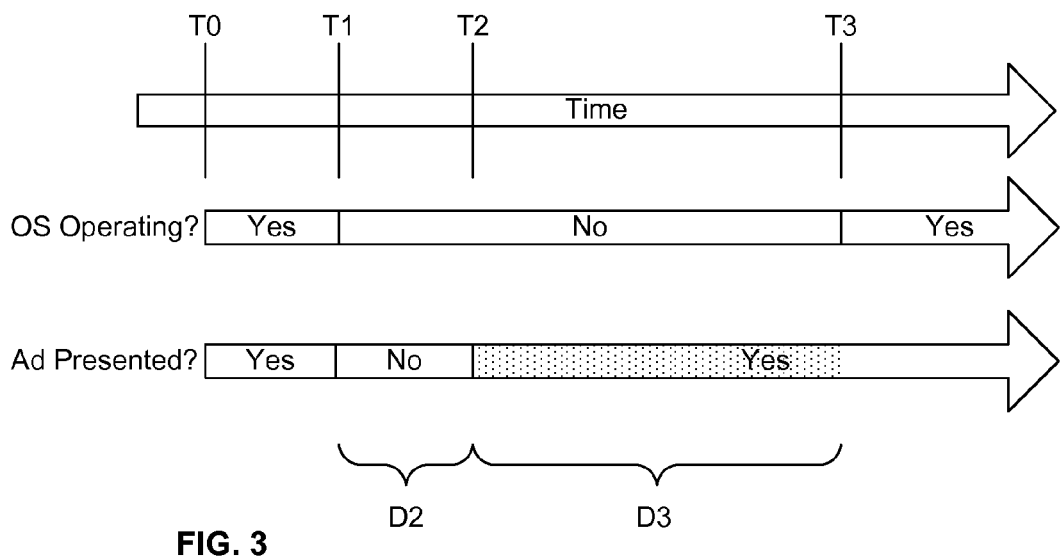
FIG. 3 presents an example timeline for handling a nonfunctional operating system with the backup video module of FIG. 1.

FIG. 3 presents an example timeline for handling a nonfunctional operating system using the backup video module of FIG. 1, for comparison with the timeline described above with regard to a conventional processing system. At time T0 of FIG. 3, the operating system in the processing device of FIG. 1 is functioning normally, the digital signage application is running on top of the operating system, and the digital signage application is causing the processing device to present video ads on one or more display devices. Then at time T1 the operating system crashes, bringing the digital signage application down with it. Consequently, the processing device stops presenting any video ads. Instead, the display may be presenting an error message, a so-called "blue screen of death," some other information that is not useful to the intended audience of the digital sign, or nothing at all. Thus, the events at times T0 and T1 of FIG. 3 are similar to the corresponding events of FIG. 2.

It may also take a significant amount of time to diagnose and repair the processing device, to get the operating system and the digital signage application operational again. For instance, after the operating system crashes, the remote management module may be used to fix the processing device from the remote processing device. The remote processing device may serve as a remote console that allows for remote management of the processing device of FIG. 1. After the remote console has completed any necessary diagnostic and corrective actions, the operating system and the digital signage application may become functional again. However, in FIG. 3, the time when the digital signage application resumes presentation of video ads is not labeled as T2, but as T3.

The reason is because another significant event happens in the processing device of FIG. 1 shortly after time T1. That event is the presentation of a video ad (or other desired video content for the digital sign) by the backup video module, despite the nonfunctional operating system. In FIG. 3, the time when the backup video module first starts causing desired digital signage content to be displayed is labeled as T2. The time between T1 and T2 is the time used to get the backup video module running, as described in greater detail below. That interval of time is labeled as duration D2. And the time between T2 and T3 is the remaining time that passes before the operating system and the digital signage application become operational again. That interval of time is labeled as duration D3. Once the operating system and the digital signage application are operational, the digital signage application may take over from the backup video module. The bottom arrow in FIG. 3 indicates that the time when "Ad Presented" is "No" is only a short time. And the portion of that arrow with dotted fill represents the time when "Ad Presented" is "Yes" (when in a conventional system it would be no) because the backup video module is presenting ads despite a nonfunctional operating system.

With a processing device that follows the teachings of the present disclosure, the total amount time required to get the operating system and the digital signage application back up may be similar to the amount of time required to complete those tasks in a conventional system. In other words, duration D1 may approximately equal D2 plus D3. However, in FIG. 3, the processing device does not wait until the operating system is functional to display ads. Instead, the downtime for the digital sign is reduced from D1 to D2, with D3 representing the additional time during which ads (or other desired information) are displayed for the intended audience.

In one scenario, D1 might be two hours, whereas a similar malfunction in the processing device of FIG. 1 might result in D2 of less than thirty seconds, and D3 of two hours. In other words, even though it might take two hours to fix the operating system, the processing device may resume presentation of desired video content within thirty seconds of the malfunction. In another scenario, D2 may be less than ten seconds. In another scenario, D2 may be less than five seconds. In another scenario, D2 may be less than two seconds. In one embodiment, the processing device completes the boot session in under two seconds through utilization of technology known as "UEFI Fast Boot" or "Fastboot BIOS." Additional information about UEFI Fast Boot may be found at www.intel.com=content=www=us=en=architecture-and-technology=unified-extensible-firmware-interface=uefi-fast-boot-windows-7.html. Additional information about Fastboot BIOS may be found at download.intel.com=design=intarch=papers=320497.pdf. More information about boot sessions is provided below.

Figure 4A:
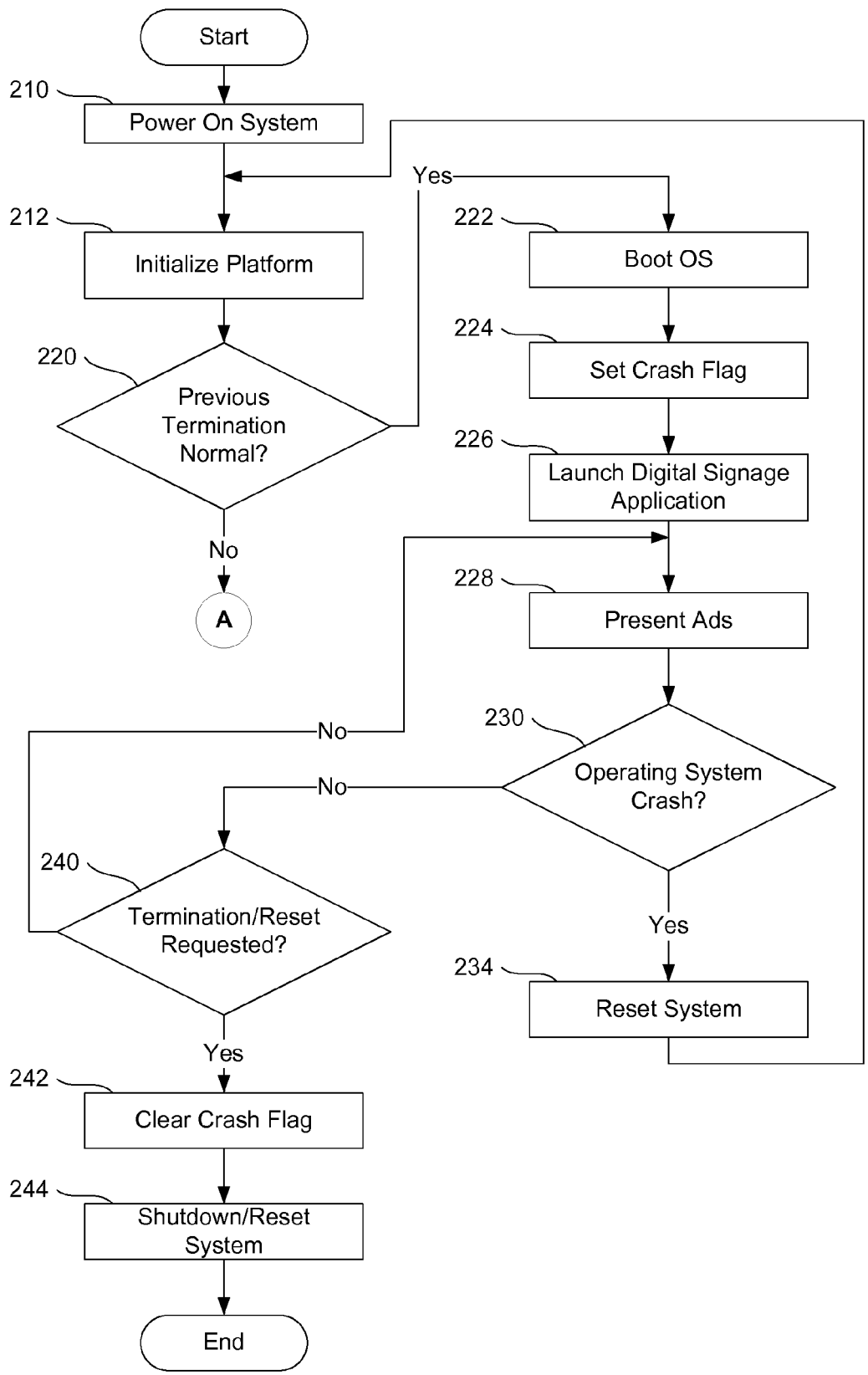
FIGS. 4A and 4B present a flowchart of an example embodiment of a process for handling a nonfunctional operating system with the backup video module of FIG. 1.
Figure 4B:
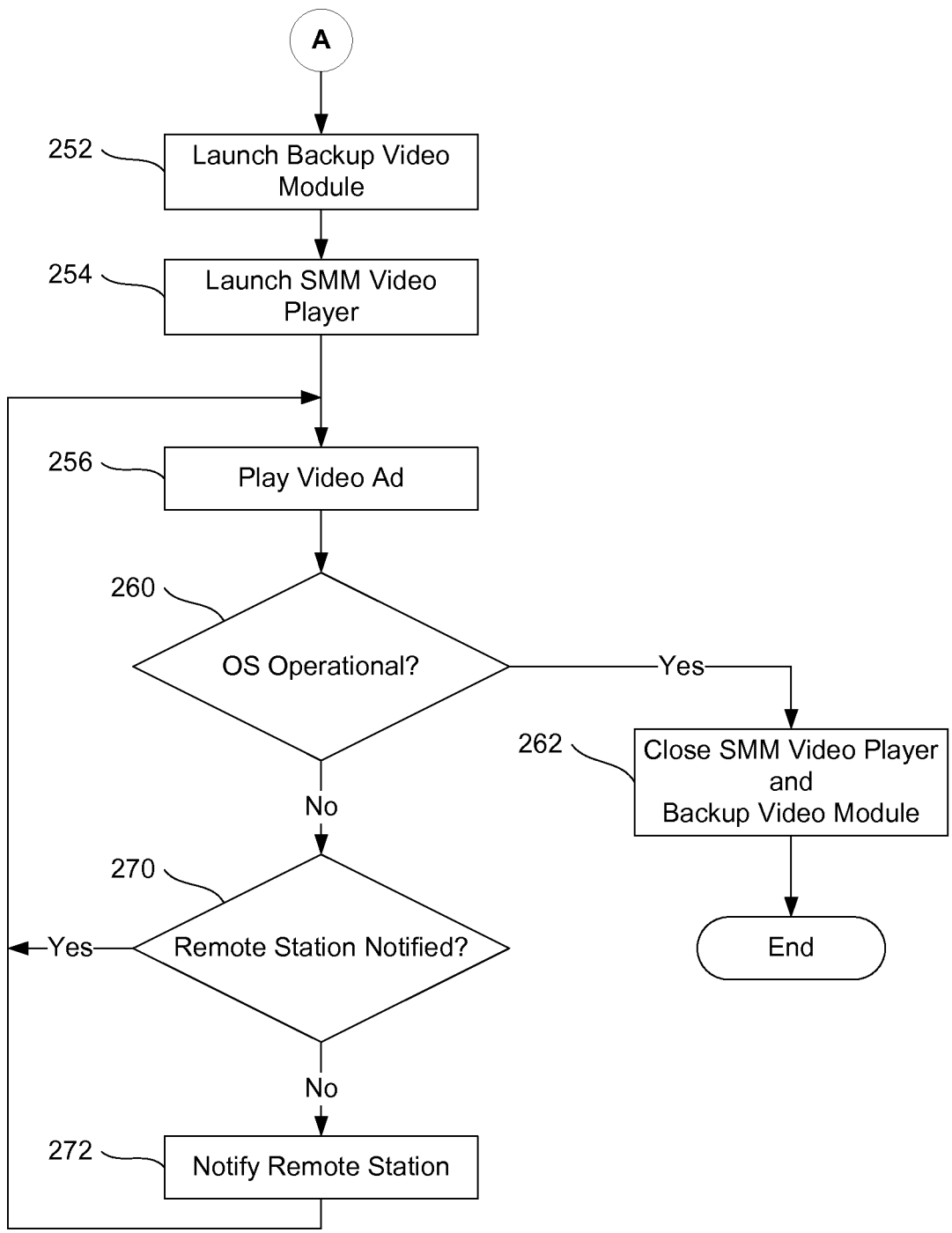

FIGS. 4A and 4B present a flowchart of an example embodiment of a process for handling a nonfunctional operating system with the backup video module depicted in FIG. 1. The process begins at block 210 of FIG. 4A with the processing device of FIG. 1 being powered on or reset. The BIOS then initializes the platform, as indicated at block 212. Part of initializing the platform is to launch the management engine. The management engine then determines whether the previous termination was normal, as shown at block 220. In one embodiment, the BIOS determines whether the previous termination was normal by checking the crash flag. In one embodiment, the crash flag is implemented as a memory overwrite request (MOR) bit. As described below, during normal startup and shutdown, the operating system may automatically set the crash flag whenever the operating system launches and clear the crash flag whenever the operating system shuts down. However, if the operating system terminates abnormally, the crash flag will remain set. During the next boot the BIOS can then determine that the operating system did not terminate normally. More details about the MOR bit may be found in a document from the Trusted Computing Group (TCG) entitled "TCG Platform Reset Attack Mitigation Specification," Version 1.00, Revision 1.00, dated May 15, 2008, which is available from the Internet at
www.trustedcomputinggroup.org=files=temp=6452209B-1D09-3519-AD815636FC36C5CF=Platform%20Reset%20Attack%20Mitigation%20Specification.pdf.

In addition, when determining if the previous termination was normal, the BIOS may check a firmware variable that indicates whether or not the operating system was repaired during the previous boot session. Such a flag may be referred to as a repair flag 64. The repair flag may be cleared by the BIOS and/or the remote console when a malfunction of the OS has been detected, for example in conjunction with the operations shown at block 272 of FIG. 4B or block 322 of FIG. 5. And the repair flag may be set by the BIOS and/or the remote console after the OS has been repaired, for example in conjunction with the operations shown at block 326 or 328 of FIG. 5. In particular, if the crash flag is set and the repair flag is set, the management engine may determine that the previous termination was normal, and the process of FIG. 4A may pass from block 220 to block 222.

Thus, if the previous termination was normal, the BIOS may boot to the operating system, as shown at block 222. The operating system code to which the BIOS transfers control may be referred to as the initial program load (IPL) code, for instance. The period of time between the initial startup of the processing device and the transfer of control to the operating system may be referred to as the boot session, and the operating environment within the processing device during the boot session may be referred to as the boot environment. Operations that happen within the boot environment may be referred to as firmware-level operations or out-of-band operations. When the BIOS transfers control to the operating system, the processing device transitions from the boot environment to the operating system environment. Operations that happen within the operating system environment may be referred to as OS-level operations, user-level operations, or in-band operations. However, certain portions of the boot environment may remain operational even after control in general has been transferred to the operating system. For instance, the management engine may continue to operate without any reliance on the operating system. Accordingly, the operations of the management engine may also be referred to as out-of-band. As indicate below, the management engine may monitor various components of the processing device to detect problems and to invoke the remote management module when necessary.

As shown at block 224 and mentioned above, after control is passed to the operating system, the operating system sets the crash flag. The operating system then launches the digital signage application, as indicated at block 226. Running on top of the operating system, the digital signage application then presents ads, as shown at block 228.

As shown at block 230, the management engine may then determine whether the digital signage application has crashed. In one scenario, the management engine determines that the digital signage application has crashed based on a determination that the OS is nonfunctional. For example, in one embodiment, a remote console periodically sends a detection command to the processing system via the Internet. When the management engine receives the detection command, it attempts to connect or communicate with an AMT agent of OS. However, if the OS has crashed, the management engine will not receive a response from the AMT agent of the OS. Consequently, the management engine will inform the remote console that the OS has crashed.

In another scenario, the management engine determines that the digital signage application has crashed based on a determination that the OS has detected failure of the digital signage application. For example, the OS may monitor whether or not the digital signage application is working. And in response to detecting that the digital signage application has crashed, the OS may set a certain UEFI runtime variable to indicate that the digital signage application (DSA) is not working. That runtime variable may be called a DSA flag. The processing system may automatically transition into SMM on a periodic basis, and when the processing system is in SMM, the management engine may check the DSA flag. If the DSA flag is set, the management engine may automatically trigger a system management interrupt (SMI) to invoke the backup video module. Thus, the backup video module may be used when the OS has not crashed, but the digital signage application has.

Referring again to block 230, if the OS and the digital signage application have not crashed, the processing device may determine whether termination or reset has been requested, as shown at block 240. If termination or reset has been requested, the operating system may reset or clear the crash flag and may then shut down or reset the processing device, as shown at block 242 and 244. The process may then end.

However, referring again to block 240, if termination or reset has not been requested, the process may return to block 228, and the processing device may continue presenting ads or other video content, as described above.

However, referring again to block 230, if the management engine detects that OS or the digital signage application has crashed, the management engine may cause the processing device to reset without the crash flag being cleared, as shown at block 234. For instance, the management may receive a reset directive from the remote console, and the management engine may automatically cause the processing device to execute a reset command that causes a hardware reset in response to receiving that reset directive. The process may then return to block 212, with the BIOS again initializing the platform. As shown at block 220, the management engine may then check again to determine whether the previous termination was normal. And in this case, since the crash flag will not have been cleared, the BIOS will determine that the previous termination was not normal. Consequently, the process will pass through page connector A to FIG. 4B, with the management engine launching the backup video module, as shown at block 252. In one embodiment, the management engine uses an SMI to trigger the backup video module.

The backup video module may then launch the SMM video player, as shown at block 254. The SMM video player may then play one or more of the backup video ads, as shown at block 256. Thus, in one embodiment, the management engine gets the value of the crash flag through the firmware variable interface provided by the BIOS, and the management engine then decides whether to trigger the backup video module. If the previous termination was not normal, the management engine triggers or launches the backup video module, which uses the SMM video player if necessary.

The ROM may be populated with backup video ads at the factory by the manufacturer of the processing device. For instance, an original equipment manufacturer (OEM) may preconfigure the processing device with an ad for an anti-virus product and an ad for a hard disk drive. In addition or alternatively, an administrator may load one or more backup video ads as part of the process of configuring the processing device to serve as a digital sign.

In addition or alternatively, the processing device may be configured to automatically retrieve ads from a remote processing device, for instance via the UEFI network stack or the remote management module. In some scenarios, the backup video module is configured to dynamically retrieve ads over the Internet from the remote console or from any other suitable provider. The service that dynamically provides those ads may be controlled by the BIOS provider, the OEM, a third-party broker, or any other suitable party.

The backup video module may play the video which was playing before the OS crashed. For instance, in one embodiment, when the digital signage application and the OS are functional, the digital signage application or the OS uses a firmware variable to save an indication of the file path to the current ad. And when the backup video module is invoked, the backup video module may retrieve the file path from that firmware variable and may then play the video which was playing before the OS crashed. For instance, if the digital signage application was playing a video ad from a local hard disk drive, the backup video module may also play that ad from that drive.

The backup video module may support many different kinds of video content, including without limitation content in any of the following formats: Moving Pictures Expert Group (MPEG) formats such as MPEG-1, MPEG-2, MPEG-4, MPG; the Audio Video Interleaved (AVI) format; the QuickTime File Format (QTFF), also known as "MOV;" the RealMedia (RM) format; the animated Graphics Interchange Format (GIF) format; etc. The backup video module may also support still picture formats such as GIF, BMP, JPEG, etc. The backup video module may scan the folder or location that contains the backup videos to determine the format of the video to be presented. The backup video module may then launch a suitable video player for that format. The video player may then present the video.

For example, in one scenario, the data storage device of the processing device contains a particular ad with moving A/V content encoded in the MPEG-4 format, and the backup video ads include a copy of that particular ad. In addition, the SMM video player includes an MPEG-4 decoder. Also, the BIOS includes a UEFI display driver with a predetermined application programming interface (API) that the backup video module can use to drive the display device. The UEFI display driver may be supplied by the manufacturer of the processing device, or if the processing device uses a third party graphics card, by the manufacturer of that graphics card, for instance. If the digital signage application is presenting that particular ad when the digital signage application crashes, when the management engine subsequently launches the backup video module, the backup video module may determine that the backup video ad to be played uses the MPEG-4 format. In response to this determination, the backup video module may launch the SMM video player. In addition, the SMM video player may pass parameters to the SMM video player to identify the backup video ad to be played.

In addition or alternatively, the processing device may have more than one SMM video player, and the backup video module may call them sequentially until one of them can find something to play. Each SMM video player, when launched, may return a status indicator to the backup video module to indicate whether that video player was able to find a video to play, so the backup video module can determine that it should continue to try the next SMM video player.

While an SMM video player is presenting a video ad, the management engine may monitor the operation of the processing device to determine whether the operating system has become operational, as shown at block 260. For instance, the management engine may monitor a video frame buffer to determine whether any component other than the SMM video player has updated the frame buffer.

In addition or alternatively, the BIOS may define a UEFI variable which can be written by the OS and read by the BIOS to indicate whether backup video is still required. Such a variable may be referred to as an "end backup video" or "EBV" flag, for instance. In addition, the operating system may set the EBV flag when the operating system is operational. Also, the SMM video player or the backup video module could check the EBV periodically and then decide to stop playing the backup video in response to the operating system setting the EBV flag.

If the management engine determines that the operating system is operational, the management engine may close or terminate the SMM video player and the backup video module, as shown at block 262. The process may then end.

However, referring again to block 260, if the operating system is not operational, the management engine may determine whether the remote processing device has been notified. If the remote processing device has already been notified, the process may return to block 256, with the SMM video player continuing to present video ads (or other desired video content) despite a nonfunctional operating system. However, if the remote processing device has not yet been notified, the process may pass from block 270 to 272, with the management engine notifying the remote processing device about the malfunction via the remote management module. The process may then return to block 256, with the SMM video player continuing to present video ads (or other desired video content) despite a nonfunctional operating system, until such time as the operating system becomes operational.

Figure 5:
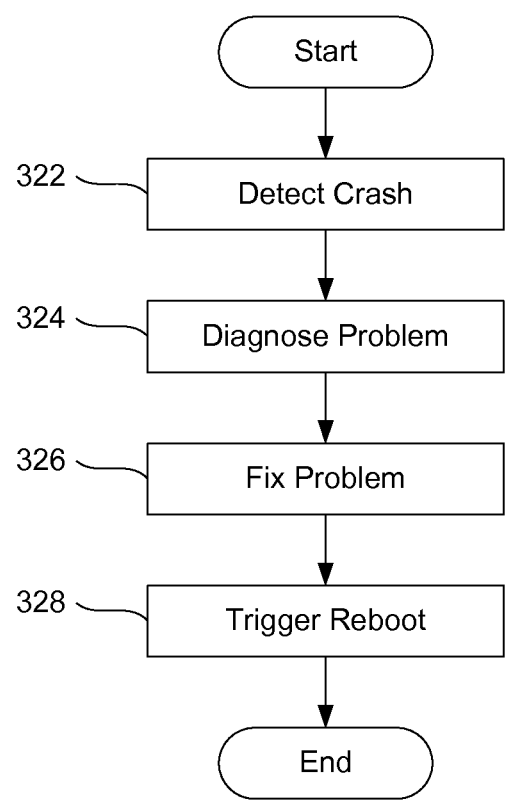
FIG. 5 is a flowchart that shows example operations associated with block 272 of FIG. 4B.

FIG. 5 is a flowchart that shows example operations associated with block 272 of FIG. 4B. For instance, the operations of FIG. 5 may be performed by the remote processing device, after the management engine has used the remote management module to notify the remote processing device that a malfunction has been detected. For purposes of FIG. 5, processing device 21 from FIG. 1 is referred to as the digital signage system, and the remote processing device 12 is referred to as the management system. As indicated at block 322, the process of FIG. 5 may begin with the management system detecting that there has been a malfunction in the digital signage system, for instance in response to receiving communications to that effect from the management engine in the digital signage system. As shown at blocks 324 and 326, the management system may then use the remote management module of the digital signage system to diagnose and fix the problem. For instance, the management system may provide a user interface that serves as a remote console, and the remote management module may allow an administrator at the management system to interact with the digital signage system via the remote console. The remote console may display error messages and other data from the digital signage system, for instance, and the administrator may use the remote console to send instructions and other data to the digital signage system as part of the process of diagnosing and fixing the digital signage system. As shown at block 328, after completing actions intended to fix the digital signage system, the management system may use the remote management module of the digital signage system to cause the digital signage system to reboot. The process of FIG. 5 may then end. The operations depicted in FIGS. 4A and 4B may then be performed, as described above.

In addition, in one embodiment the BIOS clears the crash flag after the operating system has been fixed.

As has been described, according to the present disclosure, a processing device can continue to play advertisements in digital signage when the operating system has been attacked or has crashed. For instance, the processing device can play advertisements while communicating with a remote processing device to diagnose and fix the processing device. As indicated above, the processing device may use a remote management module for remote diagnosis and repair. In addition or alternatively, the processing device may use other networking components for remote management module for remote diagnosis and repair. For instance, the BIOS may support network communication according to the UEFI specification. In other words, the BIOS may provide a UEFI network stack. UEFI Specification Version 2.3.1c, approved June 2012, is available at www.uefi.org=specs.

Any suitable programming language or combination of programming languages may be used to implement components described herein. For example, in one embodiment, the C programming language is used for some or all of the management engine, for some or all of the backup video module, and for some or all of the SMM video player.

In light of the principles and example embodiments described and illustrated herein, it will be recognized that the illustrated embodiments can be modified in arrangement and detail without departing from such principles. For instance, the description above refers to operations that are performed based on whether or not the operating system is operational. In other embodiments, the same or similar operations may be performed based on whether or not a digital signage application or a primary video module is operational. Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

As used herein, the terms "processing system" and "data processing system" are intended to broadly encompass a single machine, or a system of communicatively coupled machines or devices operating together. For instance, two or more machines may cooperate using one or more variations on a peer-to-peer model, a client/server model, or a cloud computing model to provide some or all of the functionality described herein. Those variations on the cloud computing model may include the computing service architectures referred to as infrastructure as a service ("IAAS), platform as a service ("PAAS"), software as a service ("SAAS"), or any other suitable architecture. Example data processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, systems configured to provide digital signage, and other devices for processing or transmitting information. Accordingly, unless expressly specified otherwise, references to any particular type of data processing system (e.g., a PC) should be understood as encompassing other types of data processing systems, as well.

Also, unless expressly specified otherwise, components that are described as being coupled to each other, in communication with each other, responsive to each other, or the like need not be in continuous communication with each other and need not be directly coupled to each other. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, configuration settings, and other kinds of data. As described above, when the data is accessed by a machine, the machine may respond by performing tasks, defining abstract data types or low-level hardware contexts, and/or performing other operations. For instance, data storage devices, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. Instead, the scope of the invention is intended to cover many different embodiments, including without limitation embodiments with the features described in the following paragraphs.

(A1) A method provides for displaying a video message on a data processing system with a nonfunctional operating system. In addition to the operating system, the data processing system has a first video messaging service that runs on top of the operating system and a second video messaging service that runs in a boot environment. The method involves using the first video messaging service to automatically present a first video message. The method also involves, during a boot session of the data processing system, automatically determining whether the data processing system terminated abnormally before the boot session started. The method also involves, in response to determining that the data processing system terminated abnormally before the boot session started, automatically using the backup video messaging service to present a second video message in the boot environment.

(A2) A method according to paragraph A1 further comprises automatically determining whether the first video messaging service has become nonfunctional, and in response to determining that the first video messaging service has become nonfunctional, automatically restarting the data processing system without terminating the data processing system normally. In addition, the operation of automatically using a backup video messaging service to present a second video message in the boot environment is performed after automatically restarting the data processing system without terminating the data processing system normally.

(A3) In a method according to paragraph A1, the operation of automatically determining whether the first video messaging service has become nonfunctional comprises automatically determining whether the operating system has become nonfunctional.

(A4) A method according to paragraph A1 further comprises automatically triggering an interrupt during the boot session in response to determining that the data processing system terminated abnormally before the boot session started. In addition, the operation of automatically using a backup video messaging service to present a second video message in the boot environment comprises automatically launching the backup video messaging service in response to the interrupt.

(A5) In a method according to paragraph A1, the backup video messaging service operates in system management mode.

(A6) In a method according to paragraph A1, the second video message comprises a message from the group consisting of the first video message and a video message that differs from the first video message.

(A7) In a method according to paragraph A1, the operation of automatically using a backup video messaging service to present a second video message in the boot environment comprises decompressing video content for the second video message in the boot environment, and decompressing audio content for the second video message in the boot environment.

(A8) In a method according to paragraph A1, the second video message comprises a message from the group consisting of a moving picture message comprising a stream of video images, and a multimedia message comprising video content and audio content.

(A9) In a method according to paragraph A1, the first and second video messages are advertisements.

(A10) In a method according to paragraph A1, the operation of automatically using a backup video messaging service to present a second video message in the boot environment comprises automatically retrieving the second video message from a source from the group consisting of nonvolatile memory in the data processing system, and a remote data processing system.

(A11) A method according to paragraph A1 further comprises, in response to determining that the data processing system terminated abnormally before the boot session started, automatically transmitting information to a remote data processing system to facilitate corrective action for the data processing system.

(B1) Another method provides for displaying a video message on a data processing system with a nonfunctional operating system. In addition to the operating system, the data processing system has a first video messaging service that runs on top of the operating system and a second video messaging service that runs in a boot environment. The method involves using the first video messaging service to present a first video message, and after using the first video messaging service to present the first video message, automatically determining whether the first video messaging service has become nonfunctional. The method also involves, in response to determining that the first video messaging service has become nonfunctional, automatically using the backup video messaging service to present a second video message.

(B2) In a method according to paragraph B1, the operation of automatically using the backup video messaging service to present a second video message comprises, (i) in response to determining that the first video messaging service has become nonfunctional, automatically restarting the data processing system without terminating the data processing system normally; (ii) after automatically restarting the data processing system without terminating the data processing system normally, during a boot session of the data processing system, automatically determining whether the data processing system terminated abnormally before the boot session started; and (iii) in response to determining that the data processing system terminated abnormally before the boot session started, automatically using the backup video messaging service to present the second video message.

(B3) In a method according to paragraph B1, the operation of automatically determining whether the first video messaging service has become nonfunctional comprises automatically determining whether the operating system has become nonfunctional.

(B4) In a method according to paragraph B1, the backup video messaging service operates in system management mode.

(B5) In a method according to paragraph B1, the second video message comprises a message from the group consisting of the first video message, and a video message that differs from the first video message.

(B6) In a method according to paragraph B1, the operation of automatically using a backup video messaging service to present a second video message in the boot environment comprises decompressing video content for the second video message in the boot environment, and decompressing audio content for the second video message in the boot environment.

(B7) In a method according to paragraph B1, the first and second video messages are advertisements, and the second video message comprises a message from the group consisting of a moving picture message comprising a stream of video images, and a multimedia message comprising video content and audio content.

(C) Furthermore, the features of paragraph A1 may be combined with the features described in any one or more of paragraphs A2 through A11 and B1 through B7.

(D) Also, the features of paragraph B1 may be combined with the features described in any one or more of paragraphs A1 through A11 and B2 through B7.

(E) At least one machine accessible medium comprises technology for displaying a video message on a data processing system with a nonfunctional operating system. The machine accessible medium comprises instructions which, when executed by a data processing system, enable the data processing system to perform the operations (or combination of operations) described in any of paragraphs A1 through A11, B1 through B7, C, and D.

(F) A data processing system comprises technology for displaying a video message despite a nonfunctional operating system. The data processing system comprises a processor and at least one machine accessible medium responsive to the processor. The machine accessible medium comprises instructions which, when executed by the data processing system, enable the data processing system to perform the operations (or combination of operations) described in any of paragraphs A1 through A11, B1 through B7, C, and D.

(G) For purposes of establishing initial parameters to guide examination of the present application—and without disclaiming, for purposes of rights to be secured with subsequent applications or with further prosecution of the present application, embodiments that may depart in some degree from these initial parameters—what is claimed are all implementations that come within the scope of the claims set forth in the "Claims" section, and all equivalents to such implementations.

What is claimed is:

1. At least one non-transitory machine accessible medium comprising computer instructions for displaying a video message on a data processing system with a nonfunctional operating system, wherein the computer instructions, in response to being executed on the data processing system, enable the data processing system to carry out a method comprising:

using a first video messaging service of a data processing system to automatically present a first video message on the data processing system, wherein the first video messaging service runs on top of an operating system in the data processing system;

after using the first video messaging service to present the first video message, automatically determining whether the first video messaging service has become nonfunctional; and in response to determining that the first video messaging service has become nonfunctional, automatically using a backup video messaging service to present a second video message on the data processing system, wherein the backup video messaging service operates in a boot environment of the data processing system.

2. At least one machine accessible medium comprising computer instructions according to claim 1, wherein the method further comprises:

in response to determining that the first video messaging service has become nonfunctional, automatically restarting the data processing system without terminating the data processing system normally; and after automatically restarting the data processing system without terminating the data processing system normally, during a boot session of the data processing system, automatically determining whether the data processing system terminated abnormally before the boot session started; and wherein the operation of automatically using the backup video messaging service to present the second video message is performed in response to determining that the data processing system terminated abnormally before the boot session started.

3. At least one machine accessible medium comprising computer instructions according to claim 2, wherein the method further comprises:

automatically triggering an interrupt during the boot session in response to determining that the data processing system terminated abnormally before the boot session started; and wherein the operation of automatically using a backup video messaging service to present a second video message comprises automatically launching the backup video messaging service in the boot environment in response to the interrupt.

4. At least one machine accessible medium comprising computer instructions according to claim 1, wherein the operation of automatically determining whether the first video messaging service has become nonfunctional comprises automatically determining whether the operating system has become nonfunctional.

5. At least one machine accessible medium comprising computer instructions according to claim 1, wherein the second video message comprises a message from the group consisting of:

the first video message; and a video message that differs from the first video message.

6. At least one machine accessible medium comprising computer instructions according to claim 1, wherein the operation of automatically using a backup video messaging service to present a second video message on the data processing system comprises:

decompressing video content for the second video message in the boot environment; and decompressing audio content for the second video message in the boot environment.

7. At least one machine accessible medium comprising computer instructions according to claim 1, wherein the second video message comprises a message from the group consisting of:

a moving picture message comprising a stream of video images; and a multimedia message comprising video content and audio content.

8. At least one machine accessible medium comprising computer instructions according to claim 1, wherein the operation of automatically using a backup video messaging service to present a second video message on the data processing system comprises automatically retrieving the second video message from a source from the group consisting of:

nonvolatile memory in the data processing system; and a remote data processing system.

9. At least one machine accessible medium comprising computer instructions for displaying a video message on a data processing system with a nonfunctional operating system, wherein the computer instructions, in response to being executed on the data processing system, enable the data processing system to carry out a method comprising:

using a first video messaging service of a data processing system to automatically present a first video message on the data processing system, wherein the first video messaging service runs on top of an operating system in the data processing system;

during a boot session of the data processing system, automatically determining whether the data processing system terminated abnormally before the boot session started; and in response to determining that the data processing system terminated abnormally before the boot session started, automatically using a backup video messaging service to present a second video message on the data processing system, wherein the backup video messaging service operates in a boot environment of the data processing system.

10. At least one machine accessible medium comprising computer instructions according to claim 9, wherein the method further comprises:

automatically determining whether the first video messaging service has become nonfunctional; and in response to determining that the first video messaging service has become nonfunctional, automatically restarting the data processing system without terminating the data processing system normally;

wherein the operation of automatically using a backup video messaging service to present a second video message on the data processing system is performed after automatically restarting the data processing system without terminating the data processing system normally.

11. At least one machine accessible medium comprising computer instructions according to claim 10, wherein the operation of automatically determining whether the first video messaging service has become nonfunctional comprises automatically determining whether the operating system has become nonfunctional.

12. At least one machine accessible medium comprising computer instructions according to claim 9, wherein the method further comprises:

automatically triggering an interrupt during the boot session in response to determining that the data processing system terminated abnormally before the boot session started; and wherein the operation of automatically using a backup video messaging service to present a second video message comprises automatically launching the backup video messaging service in the boot environment in response to the interrupt.

13. At least one machine accessible medium comprising computer instructions according to claim 9, wherein the operation of automatically using a backup video messaging service to present a second video message on the data processing system comprises:
   decompressing video content for the second video message in the boot environment; and
   decompressing audio content for the second video message in the boot environment.

14. At least one machine accessible medium comprising computer instructions according to claim 9, wherein the second video message comprises a message from the group consisting of:
   a moving picture message comprising a stream of video images; and
   a multimedia message comprising video content and audio content.

15. At least one machine accessible medium comprising computer instructions according to claim 14, wherein the first and second video messages are advertisements.

16. At least one machine accessible medium comprising computer instructions according to claim 9, wherein the operation of automatically using a backup video messaging service to present a second video message on the data processing system comprises automatically retrieving the second video message from a source from the group consisting of:
   nonvolatile memory in the data processing system; and
   a remote data processing system.

17. A data processing system with technology for displaying a video message without a functional operating system, the data processing system comprising:
   a processing element;
   at least one machine accessible medium responsive to the processing element; and
   instructions in the at least one machine accessible medium which, when executed, enable the data processing system to perform operations comprising:
      using a first video messaging service that runs on top of an operating system of the data processing system to present a first video message;
      automatically determining whether the first video messaging service has become nonfunctional; and
      using a backup video messaging service that runs in a boot environment of the data processing system to automatically present a second video message on the data processing system in the boot environment, in response to a determination that the first video messaging service has become nonfunctional.

18. A data processing system according to claim 17, wherein the operations further comprise:
   in response to determining that the first video messaging service has become nonfunctional, automatically restarting the data processing system without terminating the data processing system normally; and
   after automatically restarting the data processing system without terminating the data processing system normally, during a boot session of the data processing system, automatically determining whether the data processing system terminated abnormally before the boot session started; and
   wherein the backup video messaging service is adapted to automatically present the second video message in the boot environment, in response to a determination that the data processing system terminated abnormally before the boot session started.

19. A data processing system according to claim 17, wherein:
   the data processing system further comprises a service processor and a network controller responsive to the service processor, wherein the service processor and the network controller are adapted to provide an out-of-band communication channel to a remote data processing system;
   the at least one machine accessible medium comprises first and second nonvolatile data storage devices;
   the operating system and the first video message reside at least partially in the first nonvolatile data storage device;
   the backup video messaging service resides in the second nonvolatile data storage device; and
   the instructions are adapted to use the out-of-band communication channel to automatically transmit information to the remote data processing system to initiate corrective action for the data processing system, in response to determining that the data processing system terminated abnormally before the boot session started.

20. A method for displaying a video message on a data processing system with a nonfunctional operating system, the method comprising:
   in a data processing system with an operating system, a first video messaging service that runs on top of the operating system, and a backup video messaging service that runs in a boot environment of the data processing system, using the first video messaging service to present a first video message;
   after using the first video messaging service to present the first video message, automatically determining whether the first video messaging service has become nonfunctional; and
   in response to determining that the first video messaging service has become nonfunctional, automatically using the backup video messaging service to present a second video message in the boot environment.

21. A method according to claim 20, further comprising:
   in response to determining that the first video messaging service has become nonfunctional, automatically restarting the data processing system without terminating the data processing system normally; and
   after automatically restarting the data processing system without terminating the data processing system normally, during a boot session of the data processing system, automatically determining whether the data processing system terminated abnormally before the boot session started; and
   wherein the operation of automatically using the backup video messaging service to present a second video message is performed in response to determining that the data processing system terminated abnormally before the boot session started.

22. A method according to claim 21, further comprising:
   automatically triggering an interrupt during the boot session in response to determining that the data processing system terminated abnormally before the boot session started; and
   wherein the operation of automatically using the backup video messaging service to present a second video message comprises automatically launching the backup video messaging service in the boot environment in response to the interrupt.

23. A method according to claim 21, further comprising:
in response to determining that the data processing system terminated abnormally before the boot session started, automatically transmitting information to a remote data processing system to facilitate corrective action for the data processing system.

24. A method according to claim 20, wherein the operation of automatically determining whether the first video messaging service has become nonfunctional comprises automatically determining whether the operating system has become nonfunctional.

25. A method according to claim 20, wherein the second video message comprises a message from the group consisting of:
the first video message; and
a video message that differs from the first video message.

26. A method according to claim 20, wherein the second video message comprises a message from the group consisting of:
a moving picture message comprising a stream of video images; and
a multimedia message comprising video content and audio content.

27. A method according to claim 20, wherein the operation of automatically using the backup video messaging service to present a second video message on the data processing system comprises:

decompressing video content for the second video message in the boot environment; and
decompressing audio content for the second video message in the boot environment.

28. A method according to claim 20, wherein the operation of automatically using the backup video messaging service to present a second video message comprises automatically retrieving the second video message from a source from the group consisting of:
nonvolatile memory in the data processing system; and
a remote data processing system.

29. A method according to claim 20, wherein the backup video messaging service operates in system management mode.

30. A method according to claim 20, wherein:
the data processing system is configured to provide digital signage;
the first video messaging service presents the first video message as content for the digital signage when the operating system is operational; and
the backup video messaging service presents the second video message as content for the digital signage when the operating system is not functioning.

* * * * *

UNITED STATES PATENT AND TRADEMARK OFFICE
CERTIFICATE OF CORRECTION

PATENT NO. : 8,832,494 B2  Page 1 of 1
APPLICATION NO. : 13/994951
DATED : September 9, 2014
INVENTOR(S) : Qian Ouyang et al.

It is certified that error appears in the above-identified patent and that said Letters Patent is hereby corrected as shown below:

In the Claims

In column 16, line 18, in Claim 9, after "one" insert -- non-transistory --.

Signed and Sealed this
Twenty-third Day of December, 2014

Michelle K. Lee
*Deputy Director of the United States Patent and Trademark Office*